United States Patent
Kim et al.

(10) Patent No.: US 7,907,686 B2
(45) Date of Patent: Mar. 15, 2011

(54) DEMODULATING DEVICE AND METHOD IN ORTHOGONAL FREQUENCY DIVISION MULTIPLE ACCESS COMMUNICATION SYSTEM

(75) Inventors: Jun-Woo Kim, Daejeon (KR); Youn-Ok Park, Daejeon (KR)

(73) Assignees: Electronics and Telecommunications Research Institute, Daejeon (KR); Samsung Electronics Co., Ltd., Suwon-si (KR)

( * ) Notice: Subject to any disclaimer, the term of this patent is extended or adjusted under 35 U.S.C. 154(b) by 727 days.

(21) Appl. No.: 11/930,029

(22) Filed: Oct. 30, 2007

(65) Prior Publication Data

US 2008/0117962 A1    May 22, 2008

(30) Foreign Application Priority Data

Nov. 16, 2006 (KR) .................. 10-2006-0113449

(51) Int. Cl.
*H04L 27/06* (2006.01)
(52) U.S. Cl. ........................ 375/340; 375/372
(58) Field of Classification Search .................. 375/316, 375/340, 372
See application file for complete search history.

(56) References Cited

U.S. PATENT DOCUMENTS

| | | | |
|---|---|---|---|
| 7,526,011 B2 * | 4/2009 | Maeda et al. | ................ 375/141 |
| 2001/0053124 A1 | 12/2001 | Ichihara et al. | |
| 2007/0248002 A1 | 10/2007 | Kim et al. | |

FOREIGN PATENT DOCUMENTS

| | | | |
|---|---|---|---|
| JP | 02003060614 A | * | 2/2003 |
| KR | 10-2003-0045478 A | | 6/2003 |
| KR | 10-2005-0061142 A | | 6/2005 |
| KR | 1020050051746 A | | 6/2005 |
| KR | 10-2006-0087057 A | | 8/2006 |

OTHER PUBLICATIONS

Tsuschie Koji, OFDM Modulation/Demodulation System and Method Therefor, Feb. 28, 2003, JP 2003060614 (Abstract for Japanese Patent No. JP02003060614A).*
Machine translation of JP02003060614A, Aug. 11, 2010.*
Wang, et al., "Improving Performance of Multi-user OFDM Systems Using Bit-wise Interleaver", Electronics Letters vol. 37, No. 19, Sep. 13, 2001.

* cited by examiner

*Primary Examiner* — Jean B Corrielus
(74) *Attorney, Agent, or Firm* — Jefferson IP Law, LLP

(57) ABSTRACT

The present invention relates to a demodulating device and method in an orthogonal frequency division multiple access (OFDMA) communication system. A demodulating device according to an exemplary embodiment of the invention uses only one demodulator, one slot buffer, and one channel decoder to demodulate a plurality of data bursts included in one frame. In addition, in order to reduce a memory size required to demodulate a plurality of data bursts, a memory is managed in the units of sub-channels, instead of classifying memory cells so as to correspond to the data bursts. According to the demodulating device, it is possible to simplify a hardware structure and to reduce a memory size required to demodulate data bursts. As a result, it is possible to reduce manufacturing costs and decrease the number of signal lines of a channel decoder required for an interface.

13 Claims, 10 Drawing Sheets

DEMODULATING DEVICE AND METHOD IN ORTHOGONAL FREQUENCY DIVISION MULTIPLE ACCESS COMMUNICATION SYSTEM

CROSS-REFERENCE TO RELATED APPLICATION

This application claims priority to and the benefit of Korean Patent Application No. 10-2006-0113449 filed in the Korean Intellectual Property Office on Nov. 16, 2006, the entire content of which is incorporated herein by reference.

BACKGROUND OF THE INVENTION (a) Field of the Invention

The present invention relates to a demodulating device and method in an orthogonal frequency division multiple access (OFDMA) communication system. More particularly, the present invention relates to a demodulating device and method for demodulating a plurality of data bursts from one frame.

(b) Description of the Related Art

In recent years, a wideband wireless access system that supports the mobility of a subscriber's terminal in addition to wireless data communication based on a fixed access point, such as a LAN, has been developed OFDMA has been adopted as the communication mode for a physical layer in the IEEE 802.16 standard among the wideband wireless access systems being currently developed.

Strictly, OFDMA means an OFDM-FDMA communication system, in which sub-carriers having a plurality of orthogonal frequencies are multiplexed by using a plurality of sub-channels. The wideband wireless access system differs from the OFDM-TDMA communication system that transmits data to user terminals through each time slot in that the same modulation level and channel scheme are transmitted as one burst. In the following description, the OFDM-FDMA system is simply referred to as an OFDMA system.

Figure 1:
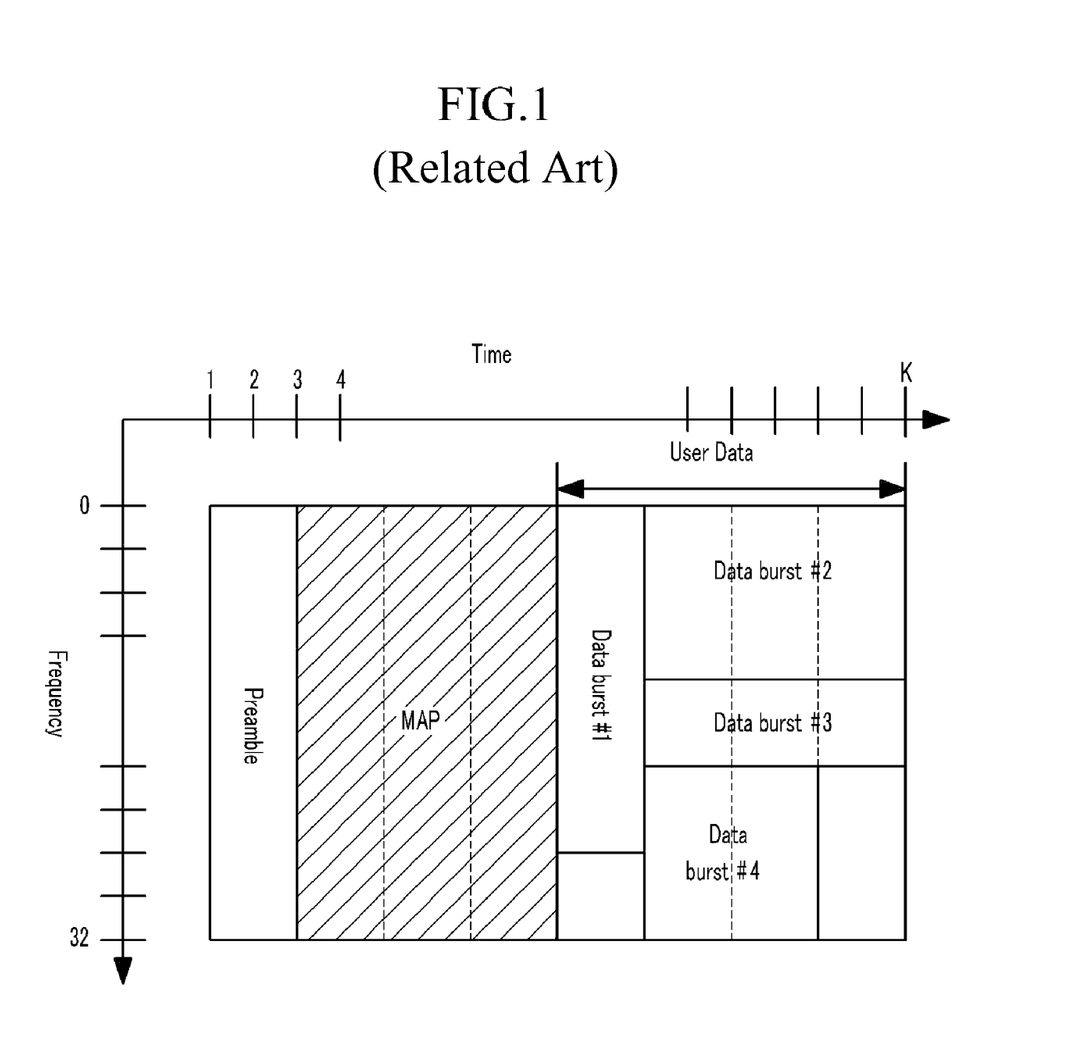
FIG. 1 is a diagram illustrating an example of a frame used in an OFDMA communication system according to the related art.

FIG. 1 is a diagram illustrating an example of a frame used in the OFDMA communication system.

FIG. 1, the horizontal axis is a time axis and is divided in the unit of symbols, and the vertical axis is a frequency axis and is divided in the unit of sub-channels. Each sub-channel is a set of a plurality of sub-carriers. Specifically, in an OFDMA physical layer, active carriers are classified into a plurality of groups, and the groups of active carriers are transmitted to different receivers. A group of sub-carriers transmitted to one receiver is called a sub-channel. The carriers forming each sub-channel may be adjacent to each other or separated at equal intervals from each other.

Referring to FIG. 1, a preamble symbol is positioned at the head of each frame, and is used to acquire time synchronization and frequency synchronization, to search a cell including a terminal, and to estimate a channel.

MAP information follows the preamble symbol. The MAP information includes various information items, such as information required for demodulation and information on the state of a base station. That is, the MAP information includes information on the position and size of a data burst allocated to the terminal and information on a modulation mode. Since the MAP information needs to be demodulated such that the user gets the MAP information, the MAP information is transmitted through all of the sub-channels of the data symbol.

Several user data bursts follow the MAP information. User data is composed of several data bursts according to users and purposes, and is two-dimensionally allocated in the OFDMA system. The data burst has a sub-channel composed of a plurality of sub-carriers as a basic unit.

The data bursts are transmitted by using different modulation and coding schemes. For example, in FIG. 1, burst Nos. 1 and 2 are modulated by QPSK in order to transmit broadcasting information to all users in a cell, and then transmitted using $\frac{1}{12}$ channel coding. Burst No. 3 is modulated by 64 QAM and then transmitted to user terminals whose channel conditions are good by using $\frac{5}{6}$ channel coding.

When a terminal receives one data burst or one broadcasting information item, a demodulating device has a simple structure. However, when a plurality of data bursts included in one frame are simultaneously received, the structure of the demodulating device of the terminal is complicated. The demodulating device of the terminal should demodulate several data bursts when data for various purposes is simultaneously transmitted to one user at various transmission speeds (for example, 28.8 kbps and 1.44 Mbps). In addition, the demodulating device of the terminal should demodulate several data bursts in an OFDM system that reads several carriers and reconfigures one information item.

Figure 2:
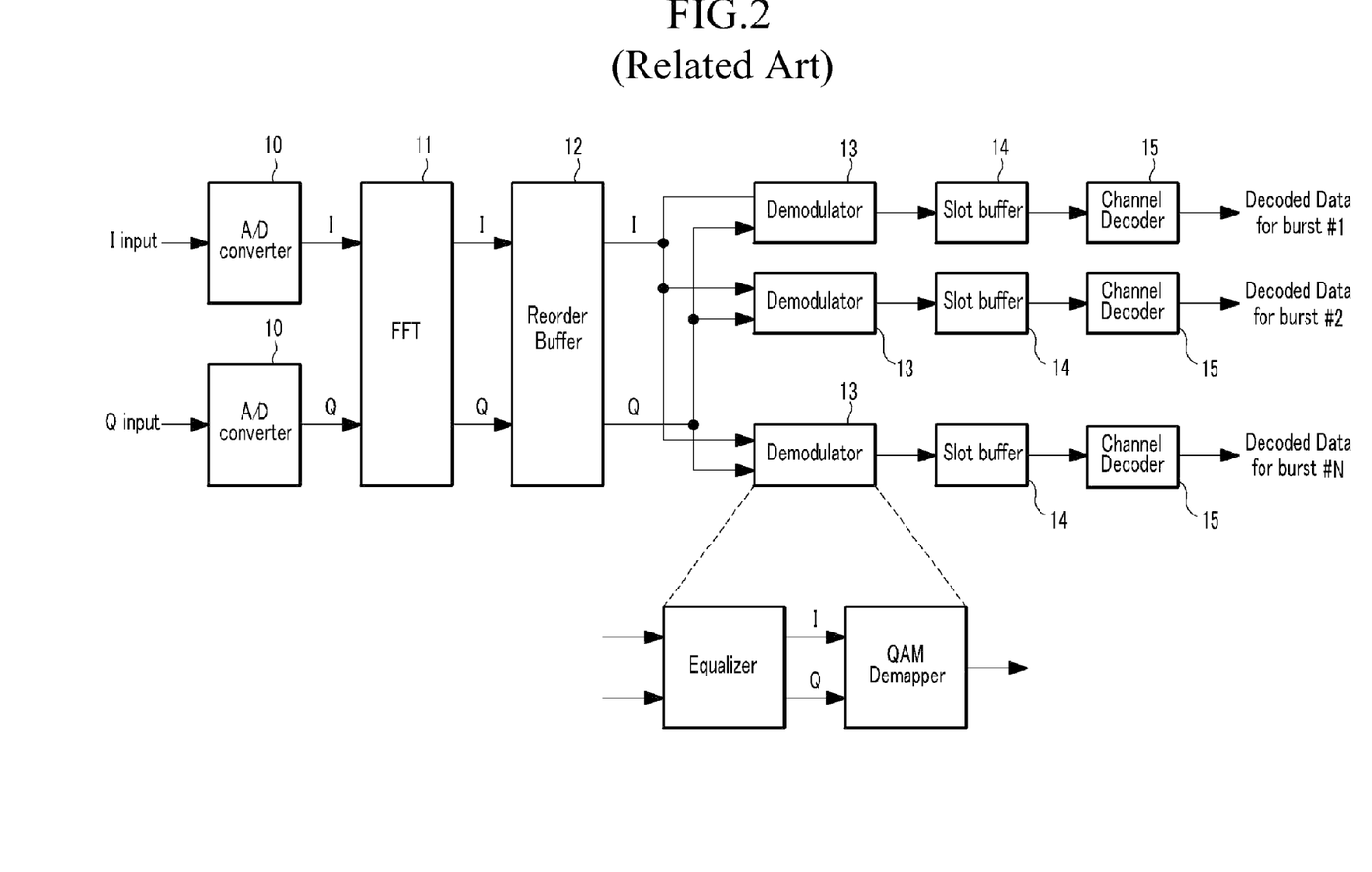
FIG. 2 is a block diagram illustrating the structure of a demodulating device of a terminal when simultaneously receiving a plurality of data bursts included in one frame in the OFDMA communication system according to the related art.

FIG. 2 is a block diagram illustrating the structure of a demodulating device of a terminal that simultaneously receives a plurality of data bursts included in one frame.

As shown in FIG. 2, the demodulating device of the terminal includes an A/D converter 10, a fast Fourier transformer (FFT) 11, a reorder buffer 12, a demodulator 13, a slot buffer 14, and a channel decoder 15. The demodulator 13 includes an equalizer and a QAM demapper.

When an OFDMA frame is received, the A/D converter 10 of the demodulating device shown in FIG. 2 converts the received signal into a digital signal, and the FFT 11 performs a fast Fourier transform on the digital signal Then, the transformed signal is stored in the reorder buffer 12, and the demodulator 13 performs channel estimation and equalization on the stored data. Subsequently, the data is subjected to QAM demapping and is then output. The data output from the demodulator 13 is stored in the slot buffer 14, and then decoded by the channel decoder 15. Then, the data is demodulated.

The number of A/D converters 10, fast Fourier transformers 11, and reorder buffers 12 is fixed since they are not concerned with the number of data bursts to be demodulated. However, the number of demodulators 13, slot buffers 14, and channel decoders 15 depends on the number of data bursts to be demodulated. That is, when N data bursts, which is a maximum number, are simultaneously demodulated from one frame N demodulators 13, N slot buffers 14, and N channel decoders 15 are needed.

Figure 3:
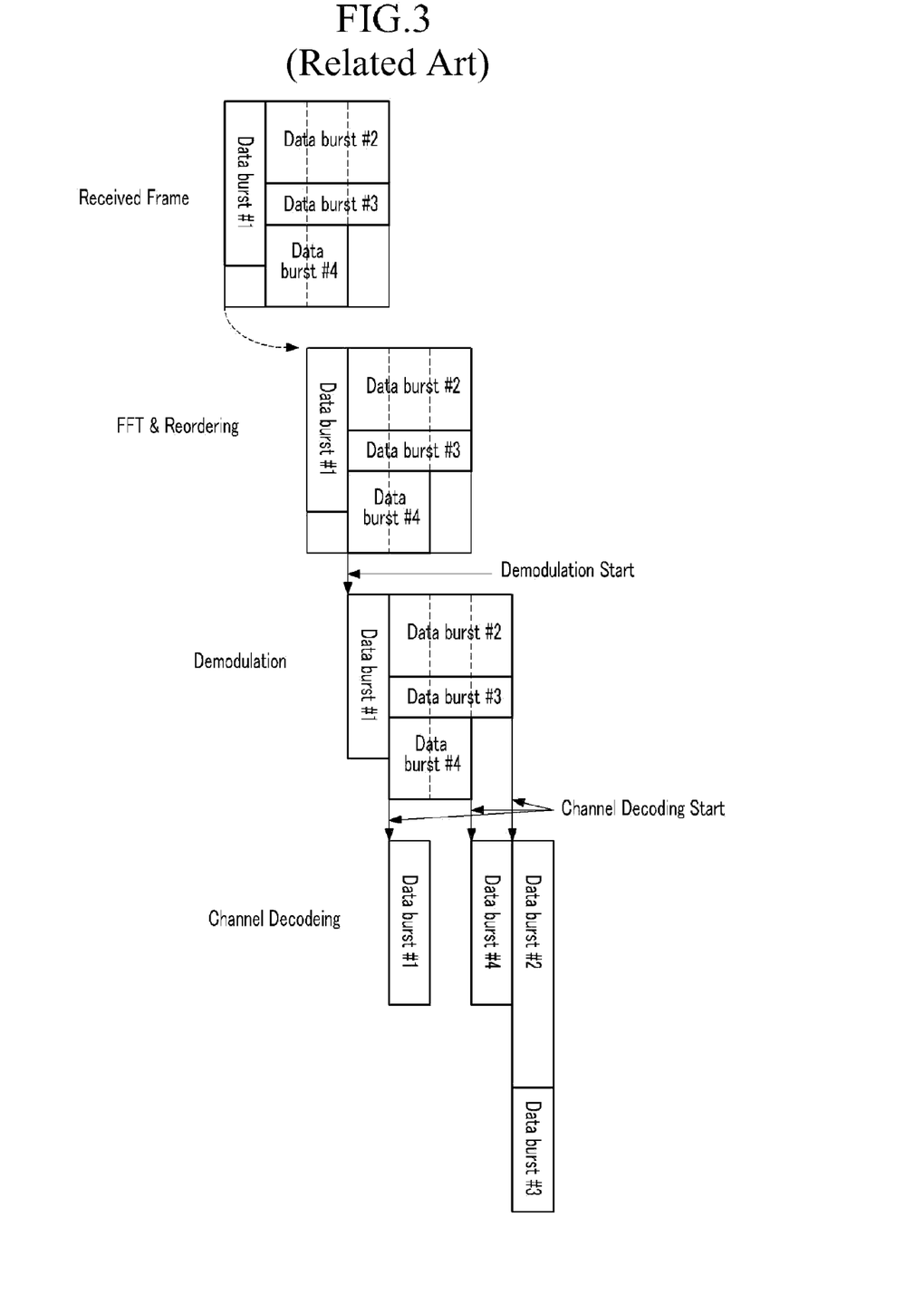
FIG. 3 is a timing chart illustrating the operation of the demodulating device demodulating a plurality of data bursts from one frame in the OFDMA communication system according to the related art.

FIG. 3 is a flowchart illustrating the operation of the demodulating device receiving the frame shown in FIG. 1 and demodulating four data bursts, that is, data burst No. 1 to data burst No. 4.

As shown in FIG. 3, a fast Fourier transform (FFT) is performed on the received data, and the transformed data is stored in the reorder buffer 12. Then, the demodulators 13 corresponding to the data bursts including the sub-channels sequentially perform channel estimation, equalization, and QAM demapping on the sub-channel data stored in the reorder buffer 12, and the processed data is stored in the slot buffer 14. That is, when sub-channel Nos. 1 and 2 corresponding to data burst No. 2 and sub-channel No. 3 corresponding to data burst No. 3 are simultaneously received, a fast Fourier transform is performed on the data corresponding to the sub-channel Nos. 1 to 3, and the transformed data is stored in the reorder buffer. Then, data corresponding to the sub-channel Nos. 1 and 2 is stored in the slot buffer 14 through the demodulator 13 corresponding to the data burst No. 2, and data corresponding to the sub-channel No. 3 is stored in the slot buffer 14 through the demodulator 13 corresponding to the data burst No, 3. When QAM demapping is completely performed on all the data of the data bursts, the channel decoder 15 performs channel decoding on the data stored in the slot buffer 14.

As described above, the demodulating device including N demodulators 13, N slot buffers 14, and N channel decoders 15 in order to demodulate N data bursts included in one data frame has a complicated hardware structure, which results in an increase in manufacturing costs.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a terminal having a demodulating device with a simple structure that is capable of demodulating a plurality of data bursts from one frame in an OFDMA communication system.

According to an embodiment of the invention, a demodulating device includes: a reorder buffer that stores one or more data burst data included in one frame and outputs the data burst data in a specific order; a burst selecting unit that controls the reorder buffer to sequentially output the data stored in the reorder buffer in the order of sub-channels to be demodulated, a demodulator that demodulates the data output from the reorder buffer in the order of the sub-channels and outputs the demodulated data; a slot buffer that stores the data output from the demodulator, and a channel decoder that decodes the data stored in the slot buffer in the units of data bursts.

According to another embodiment of the invention, a demodulating method includes: reordering one or more data burst data included in one frame and storing the reordered data; sequentially outputting the reordered data in the order of sub-channels to be demodulated; sequentially demodulating the data in the order of the sub-channels and outputting the demodulated data; and decoding the output data in the units of data bursts.

DETAILED DESCRIPTION OF THE EMBODIMENTS

In the following detailed description, only certain exemplary embodiments of the present invention have been shown and described, simply by way of illustration. However, as those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

It will be understood that the terms "comprises" and/or "comprising" when used in this specification, specify the presence of stated features, integers, steps, operations, elements, and/or components, but do not preclude the presence or addition of one or more other features, integers steps operations, elements, components, and/or groups thereof.

Hereinafter, a demodulating device for demodulating several data frames from one frame in an OFDMA communication system according to a first exemplary embodiment of the present invention will be described in detail with reference to the accompanying drawings.

Figure 4:
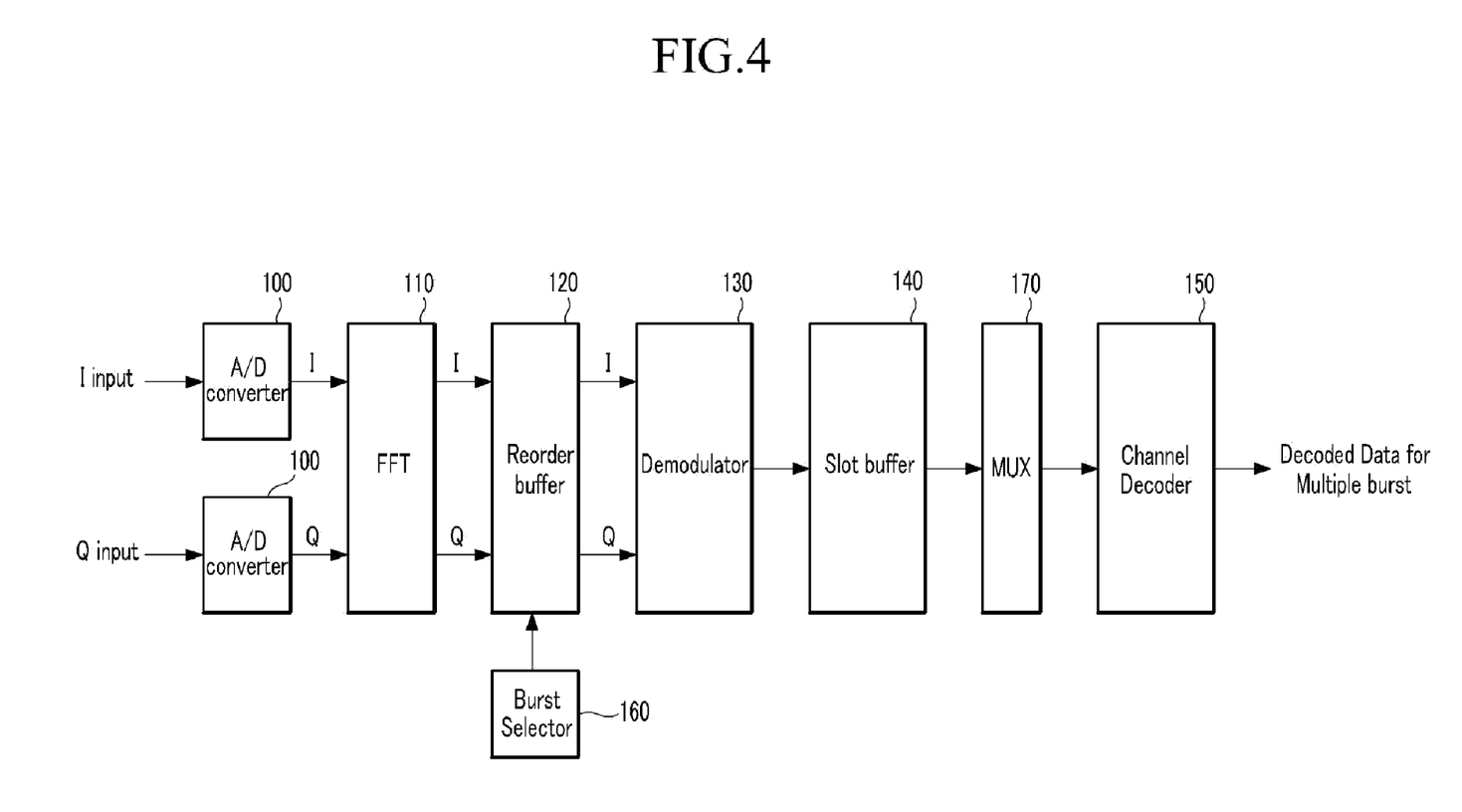
FIG. 4 is a block diagram illustrating the structure of a demodulating device for demodulating one or more data bursts from one frame in an OFDMA communication system according to a first exemplary embodiment of the present invention.

FIG. 4 is a block diagram illustrating a demodulating device for demodulating several data bursts from one frame in an OFDMA communication system according to the first exemplary embodiment of the present invention.

As shown in FIG. 4, the demodulating device includes an A/D converter 100, a fast Fourier transformer (FFT) 110, a reorder buffer 120, a demodulator 130, a slot buffer 140, and a channel decoder 150. In addition, the demodulating device may further include a burst selector 160 and a multiplexer (MUX) 170. As shown in FIG. 4, the demodulating device according to the exemplary embodiment of the present invention includes the demodulator 130, the slot buffer 140, and the channel decoder 150 regardless of the number of data bursts to be demodulated from one frame.

The A/D converter 100 receives a data frame transmitted from a transmitter, converts the data frame into digital signals, and outputs the digital signals.

The FET 110 performs a fast Fourier transform on the signals output from the A/D converter 100 to convert the signals into signals composed of frequency components, and outputs the converted signals.

The reorder buffer 120 reorders the signals output from the FFT 110 in order for the subsequent process, and stores the reordered signals.

The burst selector 160 controls the reorder buffer 120 to sequentially output the sub-channel data to the demodulator 130. That is, when data for sub-channel Nos. 1 and 2 corresponding to data burst No. 2 and data for sub-channel No. 3 corresponding to data burst No. 3 are simultaneously received and then subjected to a fast Fourier transform, and the transformed data is stored in the reorder buffer 120, the burst selector 160 controls the reorder buffer 120 to sequentially output the data for sub-channel Nos. 1 and 2 corresponding to the data burst No. 2 and the data for sub-channel No. 3 corresponding to data burst No. 3.

The demodulator 130 performs channel estimation and equalization on the basis of the sub-channel data output from the reorder buffer 120, and then performs a demodulation process of QAM demapping. Subsequently, the sub-channel data demodulated by the demodulator 130 is classified into data bursts, and the classified data bursts are stored in corresponding memory blocks of the slot buffer 140.

The slot buffer 140 should have a sufficient size or number to store data output from the demodulator 130 before the channel decoder 150 performs channel decoding. A method of determining the sizes of the slot buffer 140 and the memory block 141 that is allocated for every data burst will be described in detail later.

The channel decoder 150 performs channel decoding using the data stored in the slot buffer 140. The demodulating device may further include the MUX 170. In this case, the MUX 170 selects data in one of the memory blocks 141 of the slot buffer 140 that is allocated to a specific data burst on the basis of the address of the slot buffer 140 output from the channel decoder 150, and outputs the selected data to the channel decoder 150.

Figure 5:
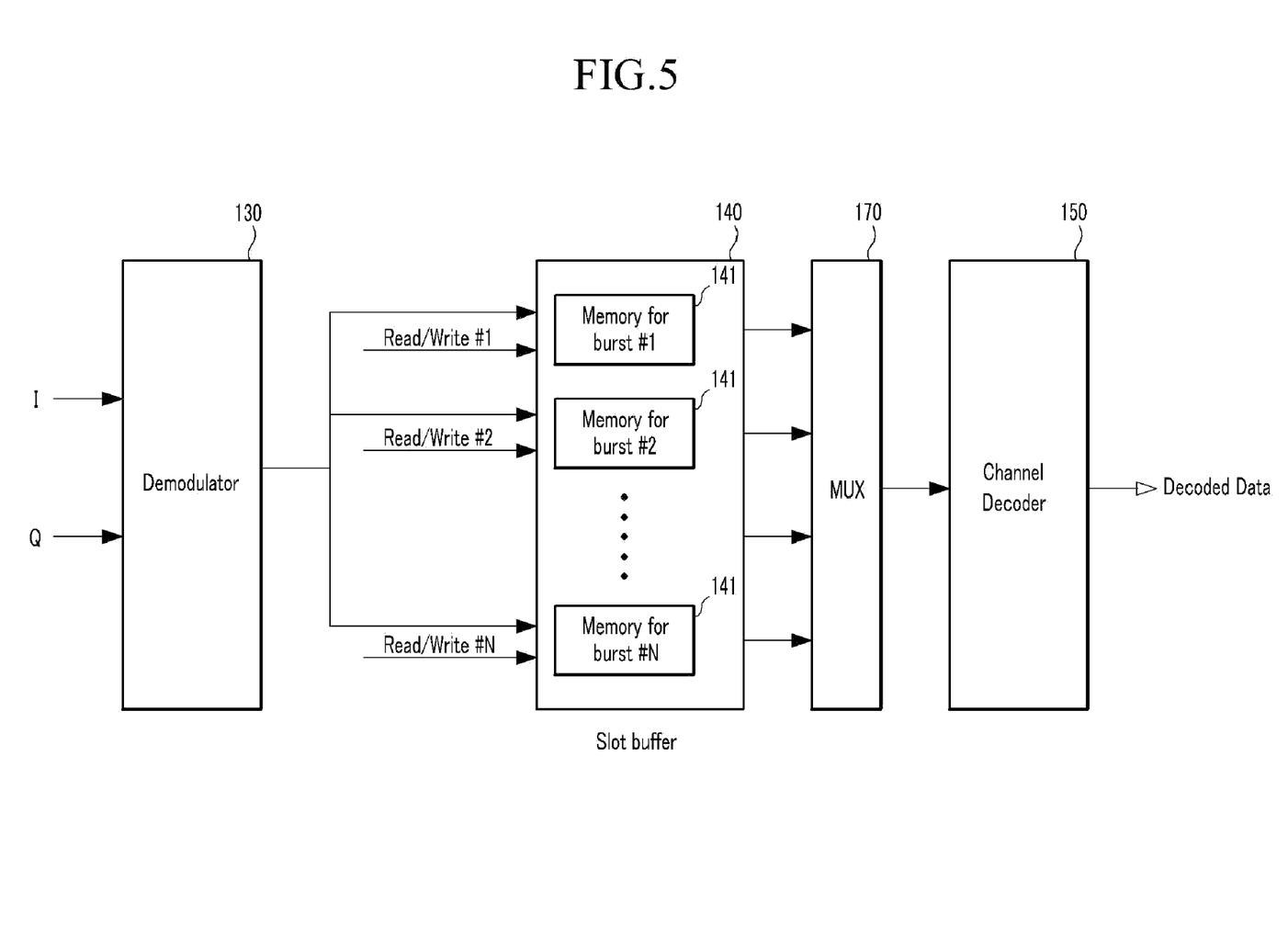
FIG. 5 is a block diagram illustrating the detailed structure of a slot buffer of the demodulating device in the OFDMA communication system according to the first exemplary embodiment of the present invention.

FIG. 5 is a diagram illustrating the detailed structure of the slot buffer 140 of the demodulating device in the OFDMA communication system according to the first exemplary embodiment of the present invention.

As shown in FIG. 5, the slot buffer 140 includes memory blocks 141 allocated to the data bursts. The sub-channel data on which the demodulator 130 has performed QAM demapping is stored in the memory block 141 corresponding to the data burst. Then, when QAM demapping is completely performed on all of the data included in the corresponding data bursts, the channel decoder 150 outputs an address in order to read valid data from the data burst. The MUX 170 selects only the data stored in the memory block 141 corresponding to the address and outputs the selected data to the channel decoder 150. The channel decoder 150 performs channel decoding. Each of the memory blocks 141 inputs or outputs data according to the selection signal (read/write #n).

The MUX 170 may be optionally provided according to the structure of the slot buffer 140. That is, when all of the memory blocks 141 of the slot buffer 140 use common input/output signal lines and the input/output of data to/from the memory blocks 141 is controlled by the address, the demodulating device does not include the MUX 170.

Meanwhile, the data that has been subjected to QAM demapping before the channel decoding should be stored in each data burst of the slot buffer 140 before QAM demapping is completely performed on all of the data in the data bursts. In this case, the size (S) of the memory required to form the slot buffer 140 is calculated by Equation 1 below.

$$S = B \times M \times C \times O \times W$$ (Equation 1)

In Equation 1, B indicates the number of data bursts to be simultaneously demodulated from one frame, M indicates the maximum number of sub-channels that are allocated to one data burst, C indicates the maximum number of sub-carriers that are allocated to one sub-channel, W indicates a bit size for a soft decision, and O is a value corresponding to the maximum value of a modulation order. In the case of QPSK, O is 2. In the case of 16 QAM, O is 4. In the case of 64 QAM, C is 6. The maximum number M of sub-channels allocated to one data burst may be in the range of 1 to a value corresponding to the number of sub-channels included in all frames.

Figure 6:
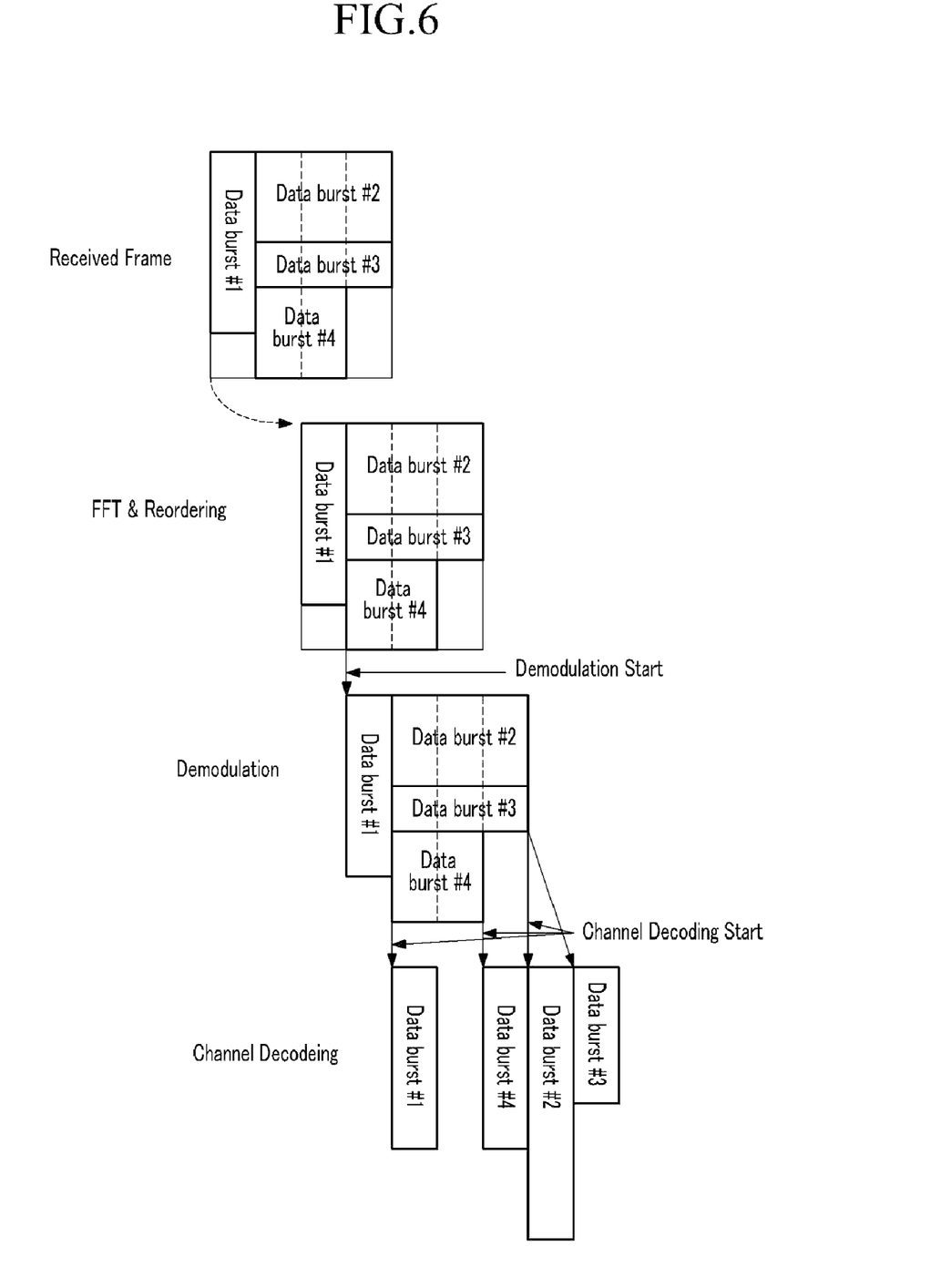
FIG. 6 is a timing chart illustrating the operation of the demodulating device demodulating a plurality of data bursts from one frame in the OFDMA communication system according to the first exemplary embodiment of the present invention.

FIG. 6 is a diagram illustrating the operational timing when the demodulating device according to the first exemplary embodiment of the present invention demodulates several data bursts from one frame. More specifically, FIG. 6 shows the operational timing when the demodulating device receives the frame shown in FIG. 1 and demodulates four data bursts, that is, data burst No. 1 to data burst No. 4.

Referring to FIG. 6, received data is subjected to a fast Fourier transform and is then stored in the reorder buffer 120. The burst selector 160 controls the reorder buffer 120 to sequentially output the data bursts including the sub-channel data to the demodulator 130. The demodulator 130 demodulates the received data bursts and outputs the demodulated data bursts, and then the slot buffer 140 stores the demodulated data bursts.

For example, when sub-channel Nos. 1 and 2 corresponding to data burst No. 2 and sub-channel No. 3 corresponding to data burst No. 3 are simultaneously received, data for the sub-channel Nos. 1, 2, and 3 is subjected to a fast Fourier transform and then stored in the reorder buffer 120. Then, the burst selector 160 controls the reorder buffer 120 to sequentially output data for sub-channel Nos. 1 and 2 corresponding to the data burst No. 2 and data for sub-channel No. 3 corresponding to the data burst No. 3.

Subsequently, QAM demapping is performed on the sub-channel data, and the sub-channel data is stored in the slot buffer 140. In this case, the sub-channel data is stored in different memory blocks corresponding to the data bursts. For example, data for sub-channel Nos, 1 and 2 corresponding to the data burst No. 2 is stored in memory block No. 1, and data for sub-channel No. 3 corresponding to the data burst No. 3 is stored in memory block No. 2. Then, when QAM demapping is completely performed on all of the data stored in the data bursts, the channel decoder 150 reads out the data burst data from the slot buffer 140 and performs channel decoding on the read data.

As described above, as shown in FIG. 3, a method of sequentially performing channel estimation, equalization, and QAM demapping for every data burst does not generate an additional time delay, and the timing when the channel decoding is performed does not vary, as compared to a method of performing channel estimation, equalization, and QAM demapping on the sub-channels in parallel.

This is because the data bursts are two-dimensionally allocated over several symbols along the time axis, and the sub-channel data received at the same time can be sequentially processed in the order of data bursts before data is processed at the next time (the next symbol). The channel decoder 150 can perform channel decoding only when QAM demapping is completely performed on all of the data in the data burst and the data is then stored in the slot buffer 140. That is, the channel decoder 150 cannot perform the channel decoding before all of the data of the data bursts arranged over several symbols is received. As a result, an additional time delay does not occur.

As described above, the demodulating device processes several data bursts included in one frame using only the demodulator 130, the slot buffer 1405 and the channel decoder 150. Therefore, the demodulating device according to this embodiment has a simpler hardware structure than the demodulating device for processing the data bursts in parallel, which results in a reduction in manufacturing costs.

Next, a demodulating device for demodulating one or more data bursts from one frame in an OFDMA communication system according to a second exemplary embodiment of the present invention wilt be described in detail with reference to the accompanying drawings.

Figure 7:
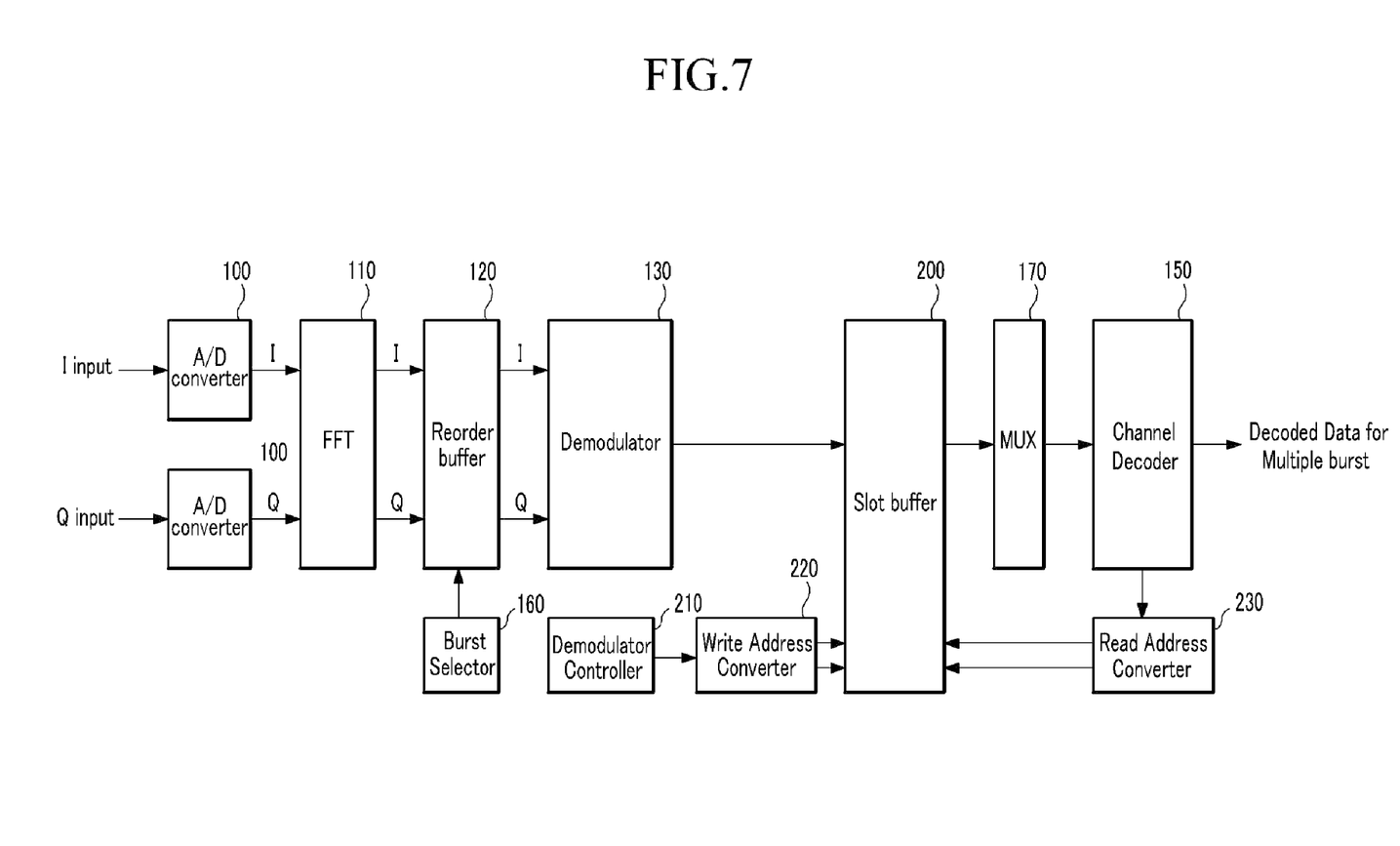
FIG. 7 is a block diagram illustrating the structure of a demodulating device for demodulating one or more data bursts from one frame in an OFDMA communication system according to a second exemplary embodiment of the present invention.

FIG. 7 is a block diagram illustrating the structure of the demodulating device for demodulating one or more data bursts from one frame in the OFDMA communication system according to the second exemplary embodiment of the present invention.

As shown in FIG. 7, the demodulating device includes an A/D converter 100, a fast Fourier transformer (FFT) 110, a reorder buffer 120, a demodulator 130, a burst selector 160, a slot buffer 200, a demodulator controller 210, a write address converter 220, and a read address converter 230.

In the demodulating device according to the second exemplary embodiment of the present invention, the structures of the A/D converter 100, the FFT 110, the reorder buffer 120, the demodulator 130, the channel decoder 150, and the burst selector 160 are the same as those in the first exemplary embodiment. Therefore, in the second exemplary embodiment, a description of the same components as those in the first exemplary embodiment will be omitted.

Figure 8:
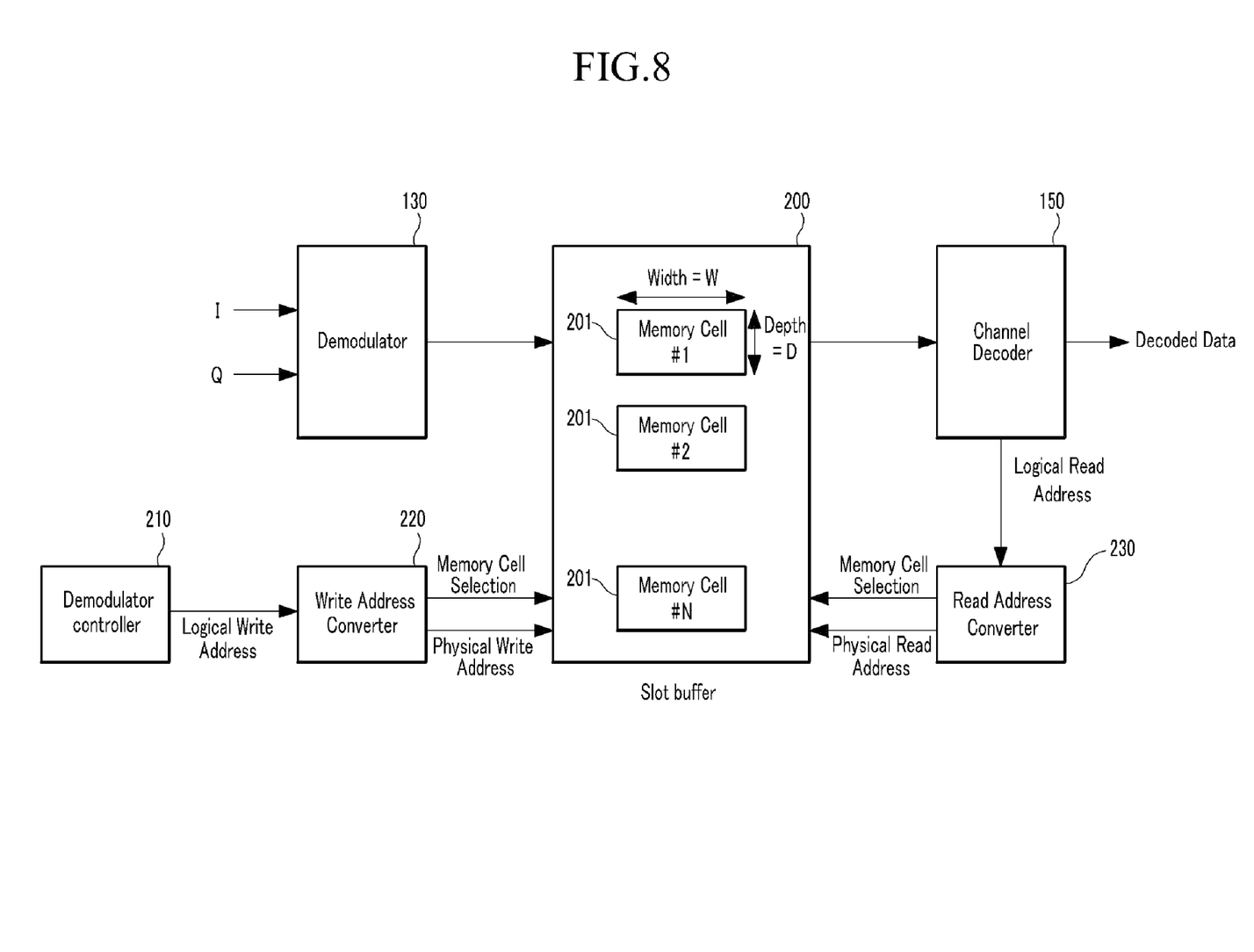
FIG. 8 is a block diagram illustrating the structure of a slot buffer of the demodulating device for demodulating one or more data bursts from one frame in the OFDMA communication system according to the second exemplary embodiment of the present invention and peripheral devices for calculating an address of the slot buffer.

FIG. 8 is a block diagram illustrating the slot buffer 200 of the demodulating device for demodulating one or more data bursts from one frame in the OFDMA communication system according to the second exemplary embodiment of the invention and peripheral devices for calculating addresses for reading/writing data from/to the slot buffer 200.

As shown in FIG. 8, the demodulating device includes the demodulator controller 210 and the write address converter 220 required to write data to the slot buffer 200. The demodulating device may further include the read address 20, converter 230 for reading data from the slot buffer 200.

The demodulator controller 210 outputs a physical address for writing data to the slot buffer 200, and the write address converter 220 converts the physical address output from the demodulator controller 210 into a cell selection signal and a logical address for actually writing data to the slot buffer 200 and outputs the cell selection signal and the logical address.

When the channel decoder 150 outputs a logical address for reading the data of the data burst from the slot buffer 200 in order to perform decoding, the read address converter 230 changes the logical address into a cell selection signal and a physical address for reading data from the slot buffer 200.

The slot buffer 200 includes a plurality of cells 201, and performs data reading and writing in the unit of cells. The memory cells, which are unit elements for reading and writing, form a memory in the second exemplary embodiment of the present invention. Each of the memory cells has a width corresponding to the number of bits W for a soft decision and a depth D corresponding to twice the maximum number C of sub-carriers that can be allocated to one sub-channel. That is, a memory size of W×C×2 is needed to form one memory cell 201. The length of the memory cell 201 is set as the maximum number of sub-carriers that can be allocated to one sub-channel in order to control the reading/writing of data from/to the slot buffer 200 in the units of sub-channels.

Unlike the first exemplary embodiment, instead of controlling the input/output of data of the data burst to/from each memory block, the slot buffer 200 sequentially stores sub-channel data in the order in which the sub-channel data is received, regardless of the data bursts and outputs only the data stored in the memory cell 201 having the data of the data burst at the request of the channel decoder 150. The memory size S' of the slot buffer can be calculated by Equation 2 below.

$$S' = M \times C \times O \times W \quad \text{(Equation 2)}$$

In Equation 2, M indicates the maximum number of sub-channels allocated to one frame, C indicates the number of sub-carriers allocated to one sub-channel, O indicates the maximum value of a modulation order, and W indicates the number of bits for a soft decision. In this case, the number $S_M$ of bits required to store sub-channel data is C×O×W. As compared to Equation 1 of the first exemplary embodiment, the memory size of the slot buffer 200 calculated by Equation 2 is not concerned with the number of data bursts to be demodulated from one frame, and data is processed in the units of sub-channels.

That is, whenever sub-channel data is input, the slot buffer 200 dynamically allocates a plurality of memory cells 201 for the sub-channel data. In this case, the number $S_{cell}$ of memory cells 201 allocated for the sub-channel data depends on the modulation order. The number $S_{cell}$ of memory cells 201 allocated for the sub-channel data is O/2, and thus the number of memory cells required to store data burst data is (M×(O/2)). That is, when data is modulated by QPSK, the number $S_{cell}$ of memory cells 201 allocated for one sub-channel is 1, while, when data is modulated by 64 QAM, the number $S_{cell}$ of memory cells 201 allocated for one sub-channel is 3.

Figure 9A:
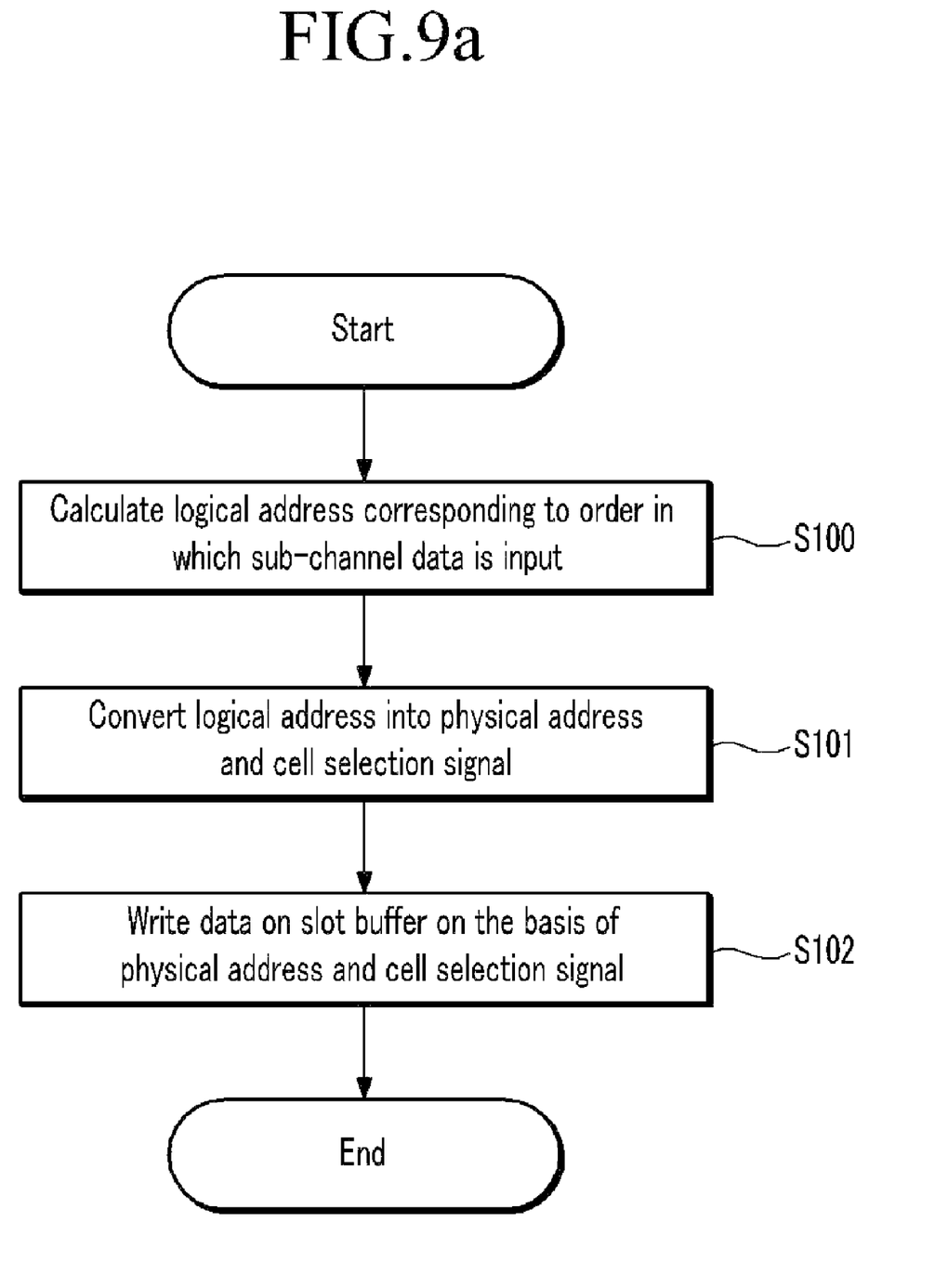
FIG. 9a is flowchart illustrating the writing of data on the slot buffer that is performed by the demodulating device for demodulating one or more data bursts from one frame in the OFDMA communication system according to the second exemplary embodiment of the present invention.
Figure 9B:
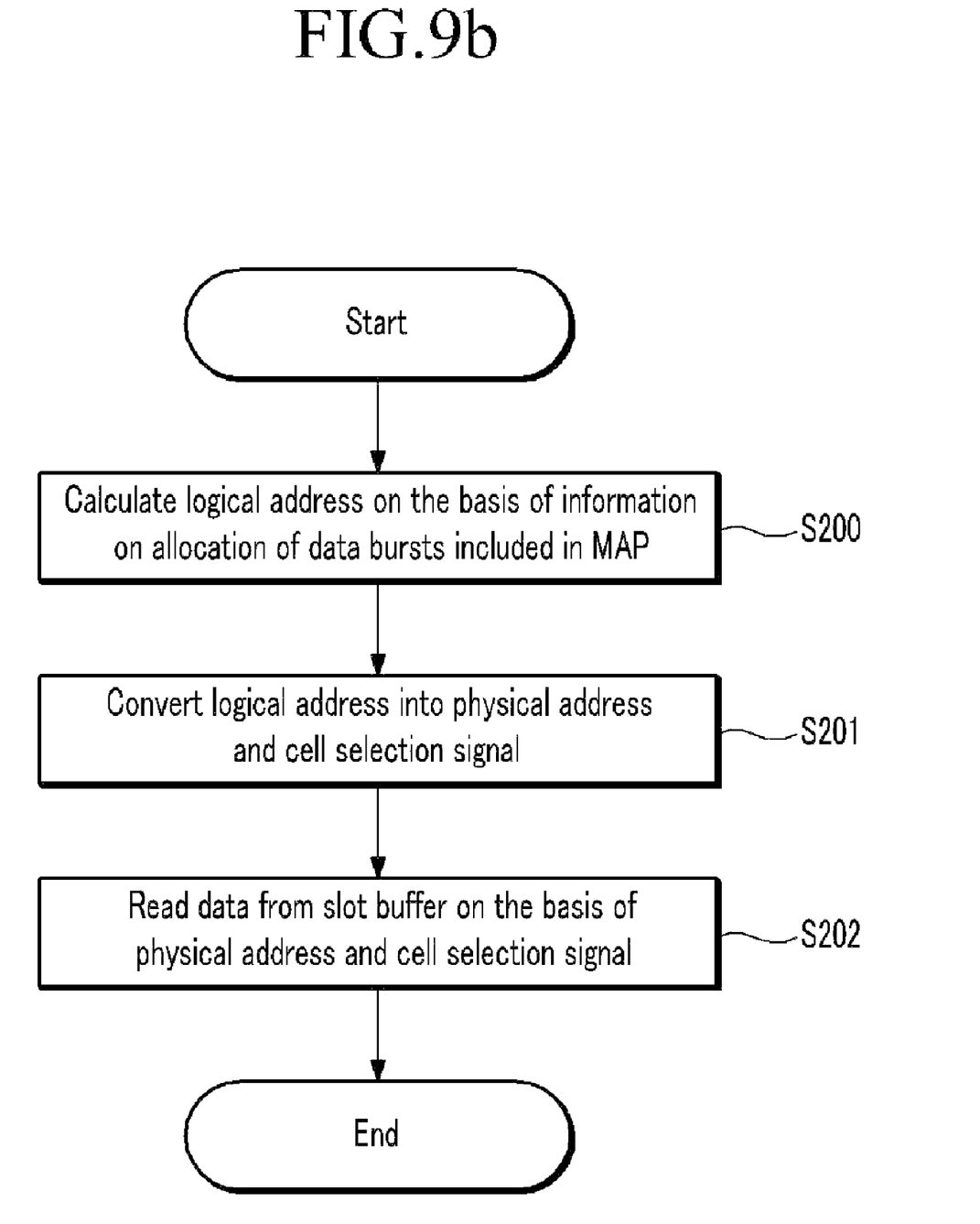
FIG. 9b is a flowchart illustrating the reading of data from the slot buffer that is performed by the demodulating device for demodulating one or more data bursts from one frame in the OFDMA communication system according to the second exemplary embodiment of the present invention.

FIGS. 9a and 9b are flowcharts illustrating the reading and writing of data from and to the slot buffer that are performed by the demodulating device for demodulating one or more data bursts from one frame in the OFDMA communication system according to the second exemplary embodiment of the present invention.

As shown in FIG. 9a, when demodulated data is written on the slot buffer 200, the demodulator controller 210 generates a logical address for writing data that is subjected to QAM demapping for every sub-channel on the slot buffer 200 (S100). The logical address is continuously allocated in the order in which the sub-channel data is subjected to QAM demapping.

The write address converter 220 converts the logical address output from the demodulator controller 210 into a memory cell selection signal and a physical address for actually writing data on the slot buffer 200 (S101). The physical address indicates a start position of the slot buffer 200 where the sub-channel data is written, and the memory cell selection signal selects one of the memory cells on which data will be written. That is, the write address converter 220 converts the logical address that is determined according to the input order of sub-channels into a cell selection signal and a physical address indicating the actual position of the memory cell 201 in the slot buffer 200, and outputs the cell selection signal and the physical address. In addition, the demodulated data is written on the slot buffer 200 at a predetermined position (S102).

The reading or writing of data from or to the memory is performed in the units of cells. When the demodulated data is input, the demodulator controller 210 and the write address converter 220 write data on the slot buffer in the units of cells.

Meanwhile, as shown in FIG. 9b, in order to perform channel decoding on one data burst, the channel decoder 150 calculates the logical address on the basis of data burst allocation information included in the MAP, and outputs the logical address (S200). The logical address is continuously output in the order of sub-channels included in the data burst whose channel will be decoded.

The read address converter 230 converts the logical address output from the channel decoder 150 into a physical address and a memory cell selection signal (S201). The physical address indicates a start position of the slot buffer 200 where the sub-channel data is read, and the memory cell selection signal selects one of the memory cells 201 from which data will be read. The slot buffer 200 outputs the sub-channel data of the data burst on the basis of the physical address and the memory cell selection signal (S202).

Meanwhile, as described above, when data is sequentially written to the slot buffer 200 in the order in which the sub-channel data is input, regardless of the data bursts, without classifying data to correspond to each data burst, data corresponding to one data burst is spread, and the spread data is discontinuously stored in different memory cells 201. The channel decoder 150 reads data burst data using a continuous logical address, in the same manner as it generally reads or writes data from or to the memory block. For this reason, in order to read the sub-channel data of the data burst that is discontinuously spread in the memory cells 201, a converter for converting the continuous logical address into the addresses of the memory cells storing the discontinuously spread sub-channel data is needed. The read address converter 230 performs this function.

When the slot buffer 200 is configured in this way, it is possible to reduce the memory size, as compared to the structure in which the slot buffer 140 includes memory blocks corresponding to the data bursts. In addition, in this case, the memory size of the slot buffer 200 is constant regardless of the number of data bursts. Further, it is possible to represent a logical address using a smaller number of signal lines than that required to represent the physical address of the slot buffer. As a result, when the channel decoder 150 is composed of a separate FPGA or ASIC, it is possible to reduce the number of signal lines required for an interface.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

As described above, according to an exemplary embodiment of the present invention, the demodulating device that processes several data bursts included in one frame using only the demodulator, the slot buffer, and the channel decoder has a simpler structure than the demodulating device for processing the data bursts in parallel. Therefore, it is possible to simplify a hardware structure and thus reduce manufacturing costs.

Further, instead of classifying memory blocks to correspond to the data bursts, a method of managing the memory in the units of sub-channels can considerably reduce a necessary memory size. Furthermore, it is possible to represent a logical address using a smaller number of signal lines than that required to represent a physical address of the slot buffer. As a result, when the channel decoder is composed of a separate FPGA or ASIC, it is possible to reduce the number of signal lines required for an interface.

What is claimed is:

1. A demodulating device comprising:
    a reorder buffer that stores at least one of data burst data included in a frame and outputs the data burst data in a predetermined order;
    a burst selecting unit that controls the reorder buffer to sequentially output the data stored in the reorder buffer in the order of sub-channels to be demodulated;
    a demodulator that demodulates the data output from the reorder buffer in the order of the sub-channels and outputs the demodulated data;
    a slot buffer that stores the data output from the demodulator;
    a multiplexer that selects only data corresponding to a data burst to be decoded among the data stored in the slot buffer and outputs the selected data; and
    a channel decoder that decodes the data output from the multiplexer.

2. The demodulating device of claim 1, further comprising:
    a fast Fourier transformer (FFT) that performs a fast Fourier transform on frame data received from a transmitting apparatus and outputs the transformed data to the reorder buffer.

3. The demodulating device of claim 1, wherein the demodulator comprises:
    an equalizer that sequentially performs channel estimation and equalization on the data output from the reorder buffer in the order of the sub-channels; and
    a quadrature amplitude modulation (QAM) demapper that sequentially performs QAM demapping on data output from the equalizer in the order of the sub-channels.

4. The demodulating device of claim 1, wherein the slot buffer is composed of memory blocks corresponding to the data burst, and data input to the slot buffer is stored in the data bursts.

5. The demodulating device of claim 4, wherein the size of the slot buffer depends on the number of data bursts to be demodulated.

6. The demodulating device of claim 3, further comprising:
    a demodulation controller that outputs logical addresses for writing data to the slot buffer so as to correspond to the order of the sub-channels;
    a write address converter that converts the logical addresses output from the demodulation controller and outputs a start position in the slot buffer and a cell selection signal; and
    a read address converter that converts logical addresses output from the channel decoder, and outputs a start position in the slot buffer and a cell selection signal,
    wherein the channel decoder outputs the logical addresses in the order of the sub-channels corresponding to the data burst to be decoded,
    wherein the slot buffer is composed of a plurality of memory cells, and
    wherein the slot buffer writes data on the basis of the start position and the cell selection signal output from the write address converter, and reads data on the basis of the start position and the cell selection signal output from the read address converter.

7. The demodulating device of claim 6, wherein the size of the slot buffer is constant even when the number of data bursts to be demodulated is changed.

8. The demodulating device of claim 6, wherein the memory cell has a size corresponding to the maximum number of sub-carriers allocated to a sub-channel.

9. The demodulating device of claim 6, wherein the channel decoder outputs the logical addresses on the basis of MAP information included in the frame.

10. A demodulating method comprising:
reordering, by a reorder buffer and a burst selecting unit, at least one of data burst data included in a frame and storing the reordered data;
sequentially outputting, by the reorder buffer and the a burst selecting unit, the reordered data in the order of sub-channels to be demodulated;
sequentially demodulating, by a demodulator, the data in the order of the sub-channels and outputting the demodulated data;
storing, the demodulated data in a memory block of a slot buffer corresponding to a data burst including the demodulated data among memory blocks of the slot buffer corresponding to the data bursts;
selecting, by a multiplexer, only data corresponding to the data burst to be decoded among the data stored in the slot buffer, and outputting the selected data; and
decoding, by a channel decoder, the output selected data.

11. The demodulating method of claim 10, further comprising:
before the reordering and storing of the data burst data, performing a fast Fourier transform on frame data received from a transmitting apparatus, and outputting the transformed data.

12. The demodulating method of claim 10, wherein the demodulating and outputting of the data includes:
sequentially performing, by an equalizer included in the demodulator, channel estimation and equalization on the output data in the order of the sub-channels, and outputting the data; and
sequentially performing, by a quadrature amplitude modulation (QAM) demapper included in the demodulator, QAM demapping on the data that has been subjected to the channel estimation and the equalization in the order of the sub-channels, and outputting the data.

13. The demodulating method of claim 10, wherein the storing of the demodulated data comprises:
outputting, by a demodulation controller, logical addresses for writing data to the slot buffer in the order of the sub-channels;
converting, by a write address converter, the logical addresses output from the demodulation controller for writing data to the slot buffer,
outputting, by the write address converter, a write start position in the slot buffer and a cell selection signal; and
storing the demodulated data in the slot buffer on the basis of the write start position and the cell selection signal,
wherein the method further comprises:
outputting, by the channel decoder, logical addresses for reading data from the slot buffer in the order of the sub-channels of the data burst to be decoded on the basis of MAP information included in the frame;
converting, by a read address converter, the logical addresses output from the channel decoder for reading data from the slot buffer;
outputting, by the read address converter, a read start position in the slot buffer and a cell selection signals; and
outputting data from the slot buffer on the basis of the read start position in the slot buffer and the cell selection signal, and
wherein the slot buffer is composed of memory cells each having a size corresponding to the maximum number of sub-carriers allocated to one sub-channel, and the memory cells are selected on the basis of the cell selection signal.

* * * * *